March 9, 1937.  E. B. WEDMORE ET AL  2,073,434
BEARING
Filed March 2, 1936
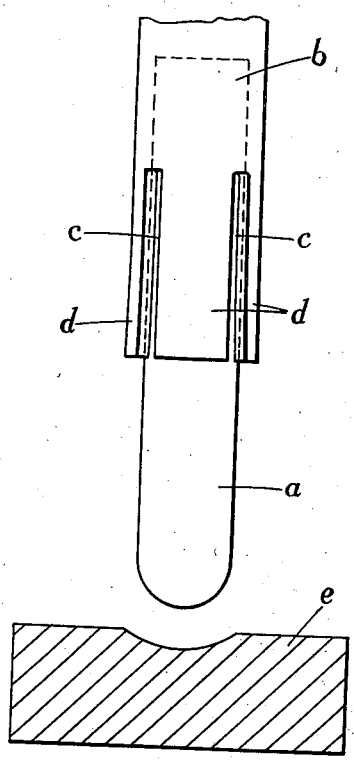
INVENTOR
Edmund B. Wedmore
and George F. Shotter
Gill & Jennings
ATTORNEYS Patented Mar. 9, 1937

2,073,434

UNITED STATES PATENT OFFICE 2,073,434

BEARING

Edmund Basil Wedmore and George Frederick Shotter, London, England

Application March 2, 1936, Serial No. 66,702
In Great Britain March 9, 1935

3 Claims. (Cl. 308—238)

This invention relates to bearings and bearing surfaces for light loads, and is particularly applicable to bearings for use in measuring and indicating instruments such as electrical meters. The object of the invention is to secure greater uniformity of friction than is achieved with bearings hitherto employed, and to reduce wear of the bearing surfaces.

According to the present invention, one of the co-operating bearing surfaces is made from a spine of the family Cactaceae, of which the thorn of the prickly pear is a particular example. The spine material may be used in the dry state or immersed in a lubricant, or it may be impregnated with a lubricant such as oil or "oil-dag". Of course, either the bearing pivot or the pivot cup may be made of the material specified. It has been found that a pivot made from the prickly pear thorn or cactus thorn running in a jewelled bearing cup shows marked improvements over a hard steel pivot running in a natural or artificial sapphire jewel cup. The thorn is not used in its natural state, but is turned by means of a high speed cutting tool, the end of the pivot being burnished by the application of a sapphire jewel. As an example, we have turned such a pivot to a radius of 0.025 inch and found it satisfactory for supporting a load of 12 grams or more. We have found that the best results are obtained by the use of a high grade pivot lubricant, and have had such pivots running for millions of revolutions and subjected to loads of more than 12 grams without there being undue wear of the bearing or increased friction.

The accompanying diagrammatic drawing shows, by way of example, a bearing embodying a prickly pear thorn pivot in accordance with the invention.

The pivot $a$ is held securely in the lower end of a spindle $b$ which is slit as shown at $c$ so as to form a number of springy tongues $d$ for gripping the pivot. The actual bearing surface of the pivot is of hemispherical shape. The jewelled bearing cup for the pivot is shown at $e$. Such a bearing, with a diameter of the pivot of 1.27 mms. has given satisfactory results even with a load of 32 grams on the pivot.

Bearings and bearing surfaces made in accordance with the invention are especially suitable for use with the moving parts of instruments such as electricity supply meters which rotate continuously for long periods. The invention, however, is applicable to all types of light bearings.

We claim:—

1. A pivot bearing suitable for electrical measuring instruments, comprising co-operating bearing surfaces, at least one of said surfaces being made from a spine of the family Cactaceae.

2. A pivot bearing suitable for electrical measuring instruments, comprising a bearing cup and a pivot co-operating therewith, said pivot consisting of a cactus thorn.

3. A pivot bearing for light loads, comprising a spindle, a pivot cup, and a pivot carried by said spindle and co-operating with said pivot cup, said pivot being made from a spine of the family Cactaceae.

EDMUND BASIL WEDMORE.
GEORGE FREDERICK SHOTTER.